(12) United States Patent
Chen

(10) Patent No.: US 11,821,563 B2
(45) Date of Patent: Nov. 21, 2023

(54) DETACHABLE VALVE

(71) Applicant: NINGBO YONGONG UNITED IMP & EXP CO., LTD, Ningbo (CN)

(72) Inventor: Daowei Chen, Ningbo (CN)

(73) Assignee: NINGBO YONGONG UNITED IMP & EXP CO., LTD, Ningbo (CN)

( * ) Notice: Subject to any disclaimer, the term of this patent is extended or adjusted under 35 U.S.C. 154(b) by 140 days.

(21) Appl. No.: 16/881,731

(22) Filed: May 22, 2020

(65) Prior Publication Data
US 2021/0285577 A1    Sep. 16, 2021

(30) Foreign Application Priority Data
Mar. 16, 2020   (CN) .......................... 202020328679.8

(51) Int. Cl.
*F16L 55/07* (2006.01)
*F16L 19/06* (2006.01)

(52) U.S. Cl.
CPC .............. *F16L 55/07* (2013.01); *F16L 19/062* (2013.01)

(58) Field of Classification Search
CPC ......... F16L 23/08; F16L 23/02; F16L 19/062; F16L 55/07; F16L 23/10; F16K 27/06
See application file for complete search history.

(56) References Cited

U.S. PATENT DOCUMENTS

| | | | | |
|---|---|---|---|---|
| 3,010,172 A * | 11/1961 | Kaplan | .................... | F16L 23/10 D8/395 |
| 4,695,079 A * | 9/1987 | Weinhold | ................ | F16L 23/06 285/364 |
| 5,470,114 A * | 11/1995 | Umney | .................... | F16L 23/18 285/347 |
| 5,647,612 A * | 7/1997 | Yoshida | .................. | F16L 21/06 285/365 |
| 7,014,225 B1 * | 3/2006 | Goodsel | .................. | F16L 23/04 285/364 |
| 7,300,078 B2 * | 11/2007 | Yamamoto | .............. | F16L 23/04 285/364 |
| 2003/0122377 A1 * | 7/2003 | Northrop | ................ | F16L 23/08 285/363 |
| 2004/0239117 A1 * | 12/2004 | Gill | ......................... | F16L 23/16 285/364 |
| 2005/0258648 A1 * | 11/2005 | Newman | .................. | F16L 23/10 285/364 |
| 2008/0197627 A1 * | 8/2008 | Baudoin | .................. | F16L 23/08 285/330 |
| 2013/0249212 A1 * | 9/2013 | McKiernan | ............. | F16L 23/10 285/407 |

FOREIGN PATENT DOCUMENTS

| CN | 204739284 U | 11/2015 | | |
|---|---|---|---|---|
| CN | 207670953 U | 7/2018 | | |
| GB | 2105424 A | * | 3/1983 | ............. F16L 23/20 |

* cited by examiner

*Primary Examiner* — Zachary T Dragicevich
*Assistant Examiner* — James A Linford
(74) *Attorney, Agent, or Firm* — Andrew C. Cheng

(57) ABSTRACT

A detachable valve is disclosed. The detachable valve comprises a main body, a connecting pipe and a connecting assembly. The main body is connected to the connecting pipe in a detachable manner through the connecting assembly.

10 Claims, 16 Drawing Sheets

DETACHABLE VALVE

CROSS-REFERENCE OF RELATED APPLICATION(S)

This application claims priority under 35 U.S.C. § 119 to Chinese Patent Application No. 202020328679.8, filed on Mar. 16, 2020, the entire content of which is incorporated by reference herein.

BACKGROUND OF THE INVENTION

1. Technical Field

The invention belongs to the technical field of valves and relates to a detachable valve

2. Description of Related Art

A valve refers to a device used for controlling direction, pressure and flow of a fluid in a fluid system. The valve is a device which enables a medium (liquid, gas and powder) in piping and equipment to flow or stop and can control the flow of the medium. In the prior art, most valves are integrated, but the integrated valves always have many inconveniences in the actual installation process, and great inconvenience in assembling work and later replacement may be resulted for people particularly when the integrated valve is installed in small space; and secondly, local structure of the valve may be damaged, rusted or oxidized when the valve has been used for a long time, and great waste of the valve resource may be resulted as the old valve can only be discarded as people who want to keep using the valve normally need to replace the valve.

BRIEF SUMMARY OF THE INVENTION

Aiming at the problems existing in the prior art, the purpose of the invention is to provide a detachable valve convenient to install The purpose of the invention can be realized via the technical scheme below: a detachable valve comprises:
  a main body; and
  a connecting pipe in detachable connection with the main body through a connecting assembly.

In the detachable valve, the connecting assembly limits relative rotation of the main body and the connecting pipe.

In the detachable valve, the main body is provided with an upper clamping ring; the connecting pipe is provided with a lower clamping ring corresponding to the upper clamping ring; and the upper clamping ring and the lower clamping ring are connected in a detachable manner through the connecting assembly.

In the detachable valve, at least a clamping side is formed in both the upper clamping ring and the lower clamping ring; and the number of the clamping sides may be two, four, six or eight.

In the detachable valve, ratchet surfaces are arranged at the edge of the upper clamping ring and the edge of the lower clamping ring in an encircling manner; and the ratchet surfaces are meshed with the interior of the connecting assembly.

In the detachable valve, the connecting assembly comprises a left holding ring and a right holding ring; one end of the left holding ring is hinged to one end of the right holding ring; and the other end of the left holding ring is in detachable connection with the other end of the right holding ring.

In the detachable valve, both the left holding ring and the right holding ring are provided with a clamping groove used for clamping the upper clamping ring and the lower clamping ring; each clamping groove is internally provided with a limiting surface used for limiting rotation of the upper clamping ring or the lower clamping ring relative to the clamping groove; and the clamping sides are in contact connection with the corresponding limiting surfaces.

In the detachable valve, both the left holding ring and the right holding ring are provided with a clamping groove used for clamping the upper clamping ring and the lower clamping ring; and each the clamping groove is internally provided a meshing tooth surface used for limiting the rotation of the upper clamping ring and/or the lower clamping ring relative to the clamping groove; and the ratchet surfaces are meshed with the meshing tooth surfaces.

In the detachable valve, the upper clamping ring is provided with at least two connecting lugs; and the lower clamping ring is provided with at least two lower connecting lugs.

In the detachable valve, the connecting assembly comprises at least two bolts; and the upper connecting lugs of the upper clamping ring are connected to the lower connecting lugs of the lower clamping ring through bolts.

In the detachable valve, the main body is provided with an extension pipe with one end far away from the main body inserted in the connecting pipe.

In the detachable valve, the connecting pipe is provided with an insertion pipe with one end away from the connecting pipe inserted in the main body.

Compared with the prior art, the invention has the beneficial effects as follows:
  1. the detachable valve can be used again just by opening the connecting assembly and replacing the corresponding main body or connecting pipe when people want to replace the main body or the connecting pipe since the main body and the connecting pipe are connected in the detachable manner through the connecting assembly; and secondly, it is convenient for people to install the valve in the small space as people can firstly connect the connecting pipe with an externally connected water pipe and then connect the main body to the connecting pipe through the connecting assembly during installation.
  2. Stability of connection between the main body and the connecting pipe is ensured as rotation of the upper clamping ring or the lower clamping ring relative to the clamping groove is avoided through contact connection between the clamping sides and the limiting surfaces.
  3. By means of variation of multiple schemes in embodiments 1 to 5, the detachable valve in the invention has a greater market value; and secondly, people can select a suitable detachable valve to bring convenience to installation based on the demands of the embodiment.

DETAILED DESCRIPTION OF THE INVENTION

Figure 1:
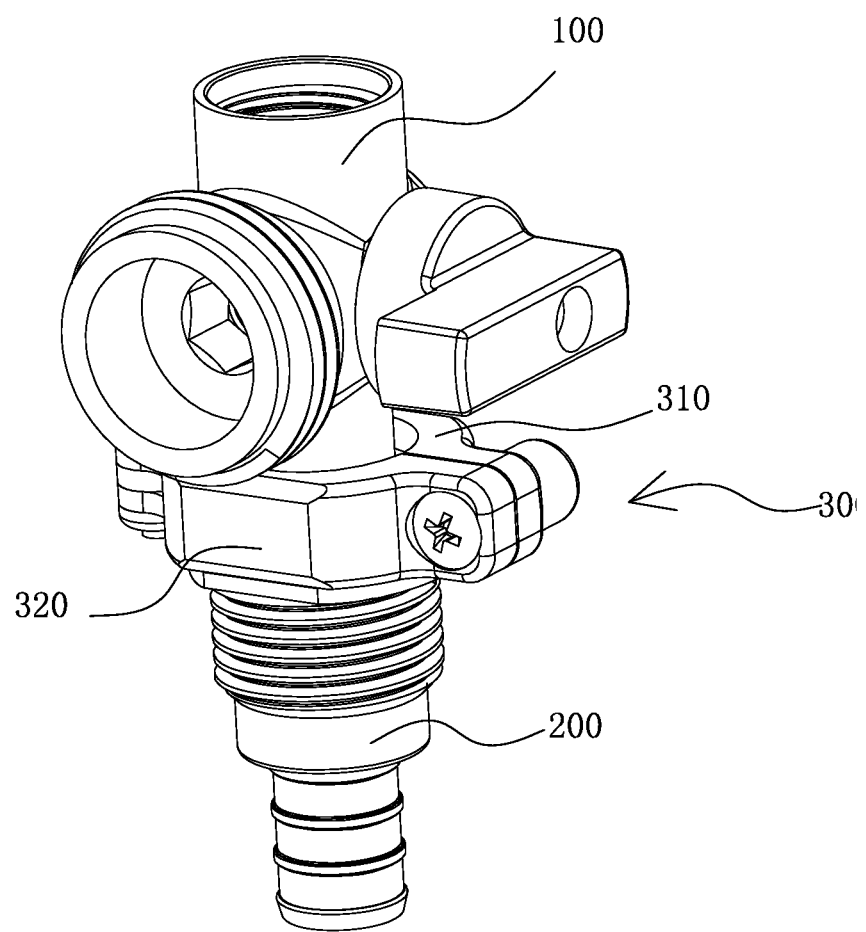
FIG. 1 is a structure diagram of a better embodiment of the invention.
Figure 2:
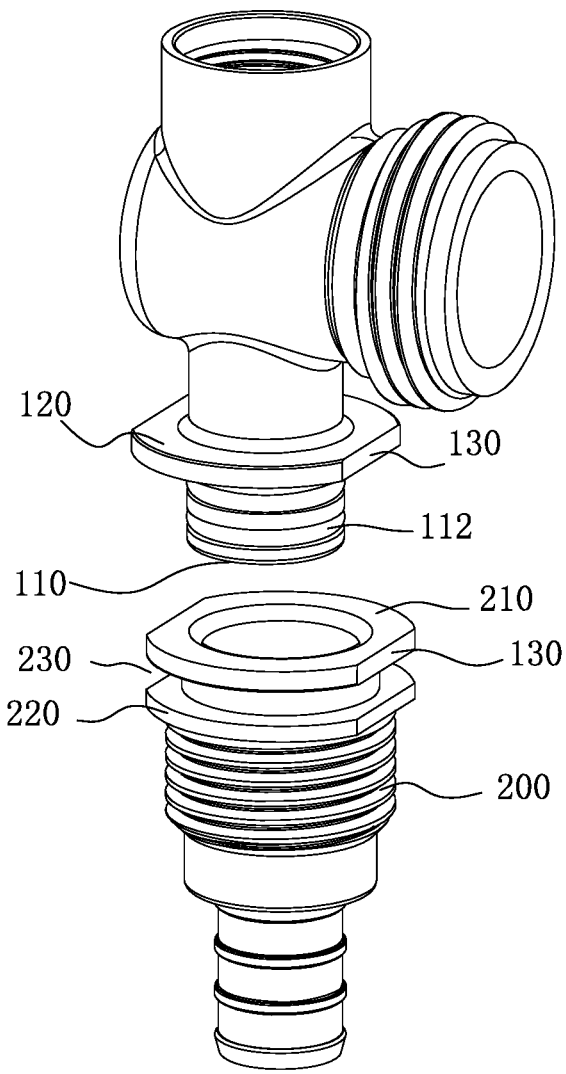
FIG. 2 is an exploded view of the main body and the connecting pipe in the embodiment 1 and the embodiment 4.
Figure 3:
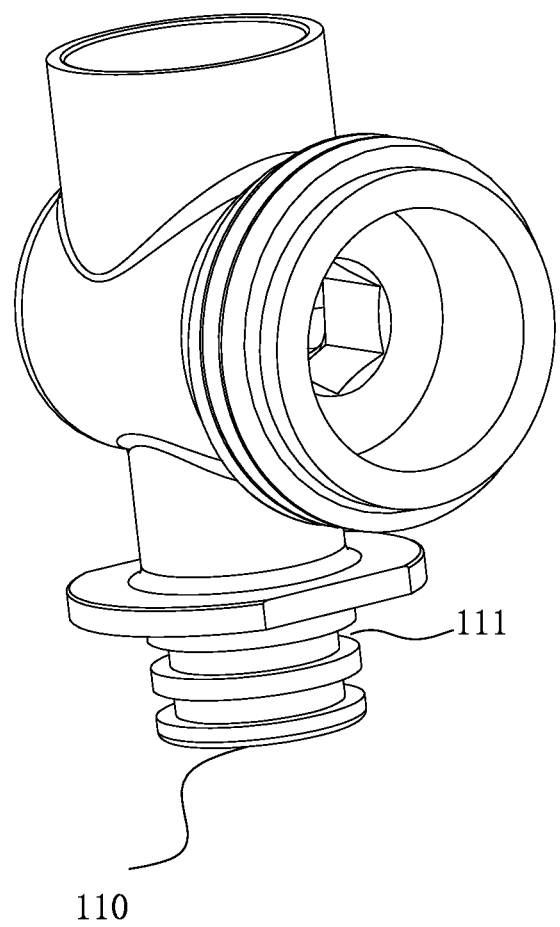
FIG. 3 is a structure diagram of the main body in the embodiment 1.
Figure 4:
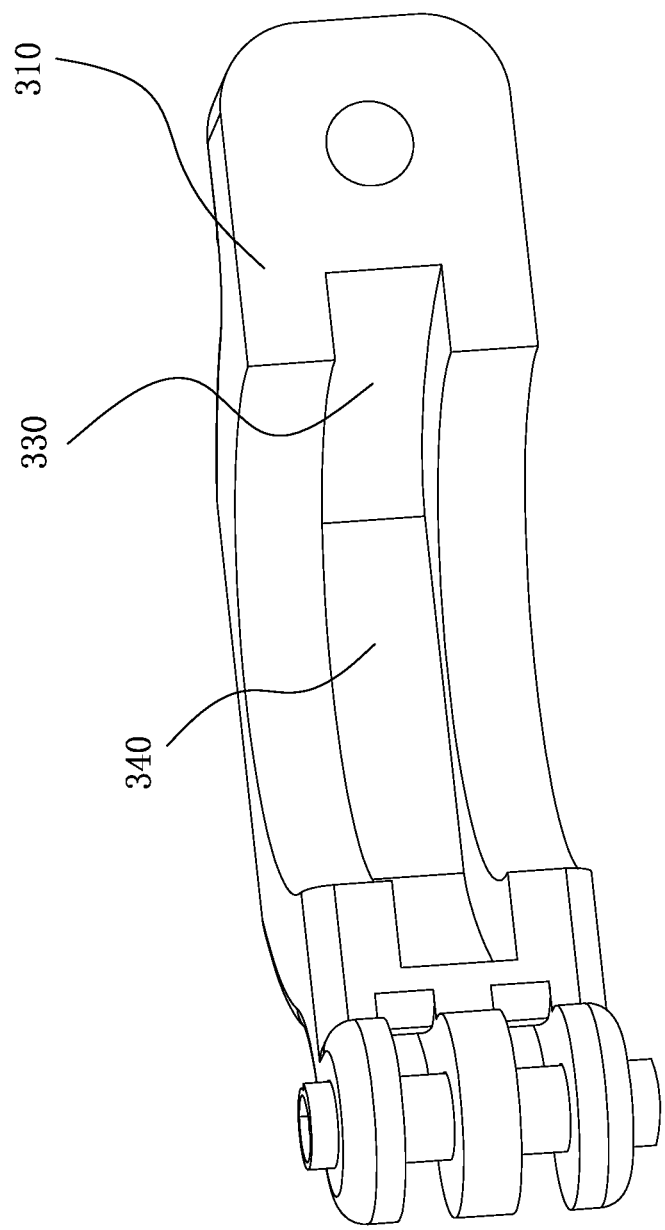
FIG. 4 is a structure diagram of the left holding ring in the embodiment 1.
Figure 5:
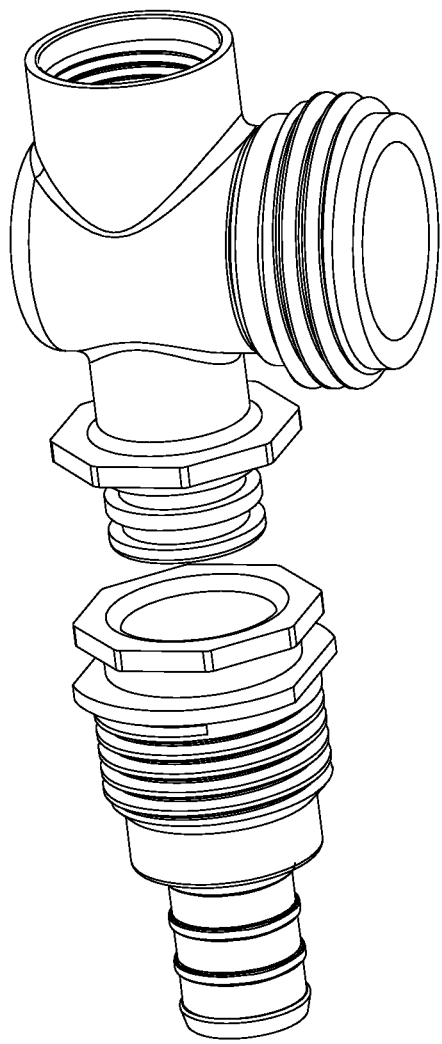
FIG. 5 is an exploded view of the clamping ring with eight clamping sides in the embodiment 1.
Figure 6:
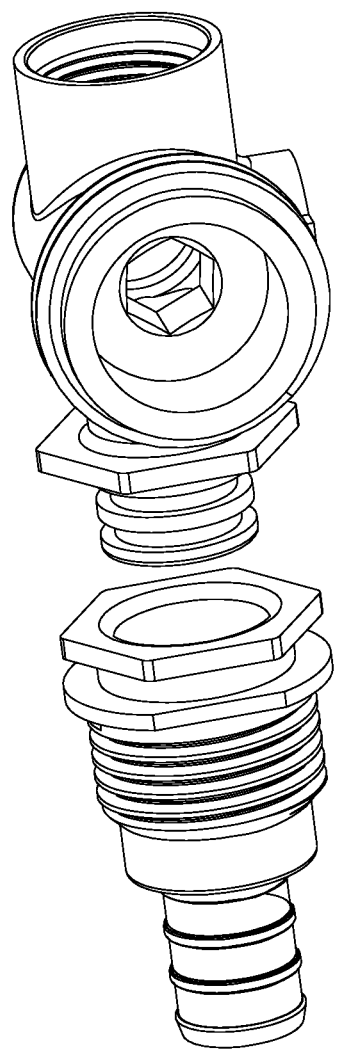
FIG. 6 is an exploded view of the clamping ring with six clamping sides in the embodiment 1.
Figure 7:
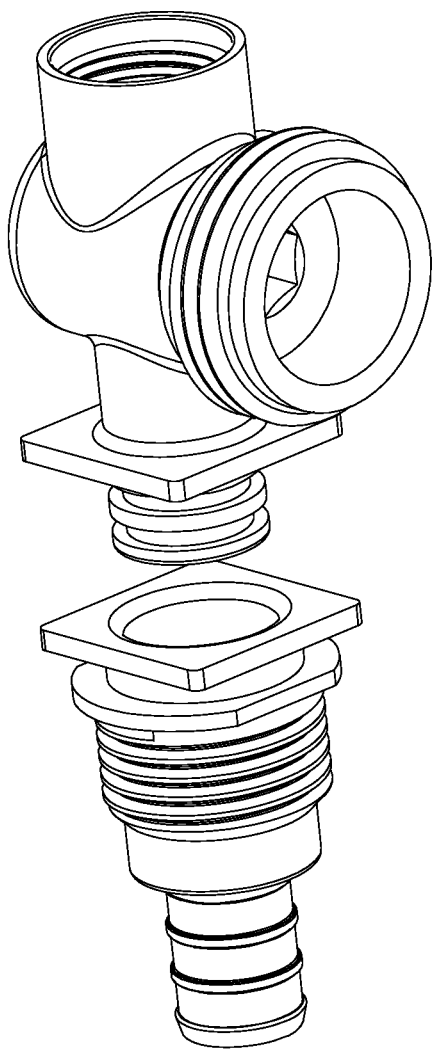
FIG. 7 is an exploded view of the clamping ring with four clamping sides in the embodiment 1.

Specific embodiments of the invention are provided below to further describe the technical scheme of the invention in combination with accompanying drawings, but the invention is not limited to the embodiments.

Embodiment 1

As shown in FIG. 1 to FIG. 7 and FIG. 12 to FIG. 16, the detachable valve comprises a main body 100, a connecting pipe 200 and a connecting assembly 300.

The main body 100 is in detachable connection with the connecting pipe 200 through the connecting assembly 300; an integral body is formed by contacting the main body 100 with the connecting pipe 200 and then connecting the main body 100 with the joint of the connecting pipe 200 through the connecting assembly 300 during installation; that is, the main body 100 and the connecting pipe 200 are connected stably; and a person can use the detachable valve again just by opening the connecting assembly 300 and replacing the corresponding main body 100 or connecting pipe 200 when the person needs to replace the main body 100 or the connecting pipe 200.

As relative rotation of the main body 100 and the connecting pipe 200 is limited by the connecting assembly 300, malposition motion between the main body and the connecting pipe may not occur when the valve is in use and stability of the valve in use is accordingly ensured.

An upper clamping ring 120 is arranged at the main body 100; a lower clamping ring 210 corresponding to the upper clamping ring 120 is arranged at the connecting pipe 200; and the upper clamping ring 120 and the lower clamping ring 210 are connected in a detachable manner through the connecting assembly 300. The upper clamping ring and the lower clamping ring are laminated together during the installation until the upper clamping ring 120 supports against the lower clamping ring 210; and then the upper clamping ring 120 and the lower clamping ring 210 are connected in the detachable manner through the connecting assembly 300.

Both the upper clamping ring 120 and the lower clamping ring 210 are provided with at least a clamping side 130; and the number of the clamping sides 130 may be two, four, six or eight; the connecting assembly 300 comprises a left holding ring 310 and a right holding ring 320; one end of the left holding ring 310 is hinged to one end of the right holding ring 320; the other end of the left holding ring 310 is in detachable connection with the other end of the right holding ring 320; both the left holding ring 310 and the right holding ring 320 are provided with a clamping groove 330 used for clamping the upper clamping ring 120 and the lower clamping ring 210; each clamping groove 330 is internally provided with a limiting surface 340 used for limiting rotation of the upper clamping ring 120 or the lower clamping ring 210 relative to the clamping grooves 330; and the clamping sides are in contact connection with the corresponding limiting surfaces 340.

In installation, the upper clamping ring 120 and the lower clamping ring 210 are in contact connection so that each clamping side 130 of the upper clamping ring 120 and the corresponding clamping sides 130 of the lower clamping ring 210 are located in one plane; then, the left holding ring 310 is sleeved to the upper clamping ring 120 and the lower clamping ring 210 through the clamping groove of the left holding ring so that one clamping side 130 of the upper clamping ring 120, one clamping side 130 of the lower clamping ring 210 and the corresponding limiting surfaces 340 in the left holding ring 310 are in contact connection; then the right holding ring 320 rotates relative to the left holding ring 310 until the right holding ring 320 is also sleeved to the upper clamping ring 120 and the lower clamping ring 210 through the clamping groove 330 of the right holding ring 120, and the other clamping side 130 of the upper clamping ring 120 and the other clamping side 130 of the lower clamping ring 210 are in contact connection with the corresponding limiting surfaces 340 in the right holding ring 320; after that, the left holding ring 310 and the right holding ring 320 are connected through screw threads so that the left holding ring 310 and the right holding ring 320 can be sleeved to the upper clamping ring 120 and the lower clamping ring 210 stably and the upper clamping ring 120 or the lower clamping ring 310 cannot be separated from the clamping groove 330. Next, due to contact connection of the clamping sides 130 and the limiting surfaces 340, rotation of the upper clamping ring 120 or the lower clamping ring 210 relative to the clamping grooves 330 is avoided and stability of connection between the main body 100 and the connecting pipe 200 is accordingly ensured.

A limiting ring 220 is also arranged on the side surface of the connecting pipe 200; a gap 230 exists between the limiting ring 220 and the lower clamping ring 210; and the lower end surface of the left holding ring 310 and the lower end surface of the right holding ring 320 are embedded in the gap 230 when a person clamps the upper clamping ring 120 and the lower clamping ring 210 in the clamping grooves 330; that is, the lower end surface of the left holding ring 310 and the lower end surface of the right holding ring 320 are clamped between the lower clamping ring 210 and the limiting ring 220 to accordingly avoid malposition movement of the connecting assembly 300 when the detachable valve is in use.

Embodiment 2

Figure 8:
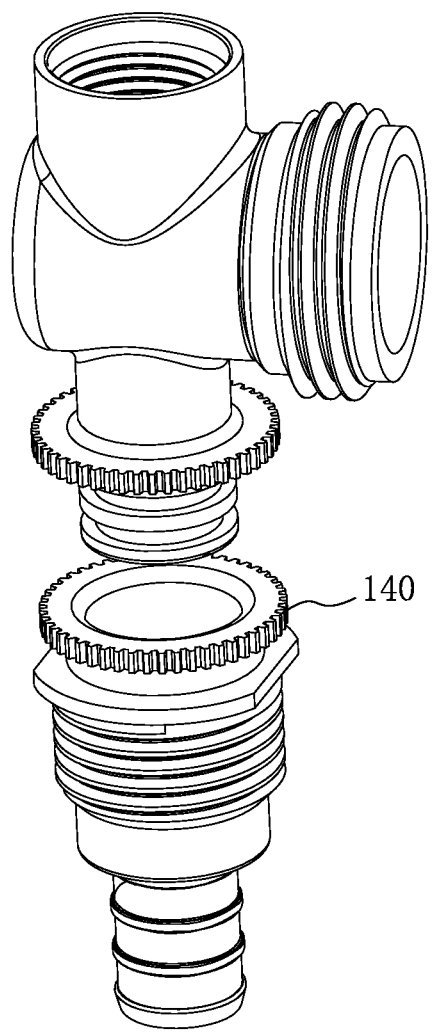
FIG. 8 is an exploded view of the main body and the connecting pipe in the embodiment 2.
Figure 9:
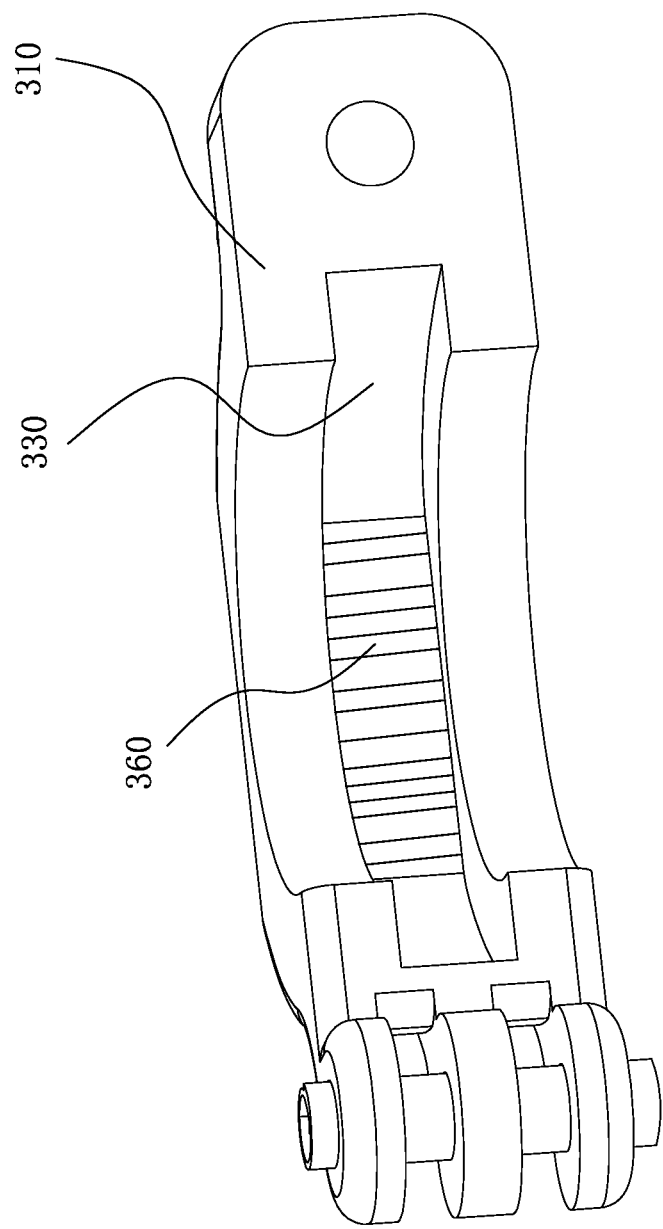
FIG. 9 is an exploded view of the left holding ring in the embodiment 2.

As shown in FIG. 8 to FIG. 9, the distinction between the embodiment 1 and this embodiment is that the structures of the upper clamping ring and the lower clamping ring and the internal structure of the clamping grooves are changed in this embodiment.

Ratchet surfaces 140 are arranged at the edge of the upper clamping ring and the edge of the lower clamping ring in an encircling manner, the ratchet surfaces 140 are meshed with the interior of the connecting assembly; specifically, meshed tooth surfaces 360 meshed with the ratchet surfaces 140 are arranged in the interior of the clamping groove of the left holding ring and the interior of the clamping groove of the right holding ring; and the meshed tooth surface 360 of the left holding ring and the meshed tooth surface 360 of the right holding ring are meshed with the ratchet surfaces 140 in the assembling process to accordingly prevent rotation of the upper clamping ring relative to the lower clamping ring.

Embodiment 3

Figure 10:
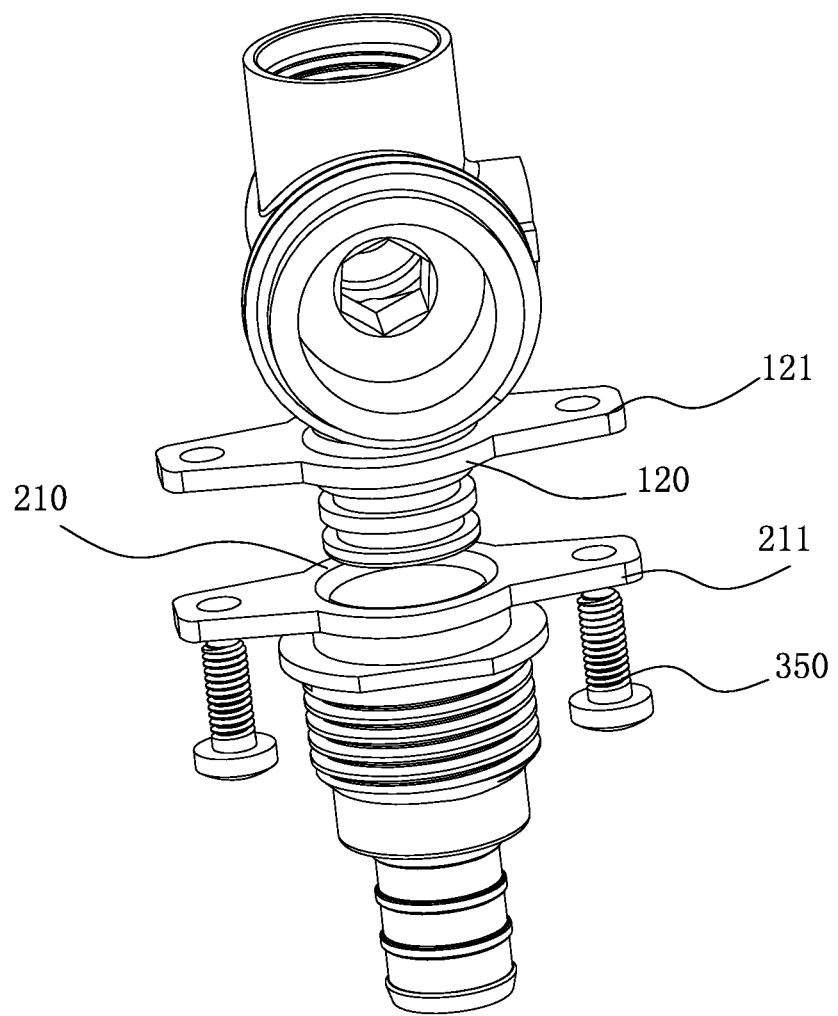
FIG. 10 is an exploded view of the main body and the connecting pipe in the embodiment 3.

As shown in FIG. 10, different from the embodiment 1, the shape of both the upper clamping ring and the lower clamping ring and the structure of the connecting assembly are changed in the embodiment 3.

Specifically, at least two upper connecting lugs 121 are arranged on the upper clamping ring; at least two lower connecting lugs 211 are arranged on the lower clamping ring; the connecting assembly comprises at least two bolts 350; and the upper connecting lugs 121 of the upper clamping ring and the lower connecting lug 211 of the lower clamping ring are connected through corresponding bolts 350 during installation to accordingly prevent rotation of the upper clamping ring relative to the lower clamping ring and thus bring convenience to installation for people.

Embodiment 4

As shown in FIG. 1 to FIG. 7, the distinction between this embodiment and the embodiment 1 is that an extension pipe is arranged additionally on the basis of the embodiment 1 in this embodiment.

Specifically, the main body 100 is provided with the extension pipe 110 having one end far away from the main body 100 inserted in the connecting pipe 200; multiple circular grooves 111 are formed in the side surface of the extension pipe 110; each circular ring 111 is provided with a sealing ring 112; the inner diameter of one end of the connecting pipe 200 close to the extension pipe 110 is greater than that of the other end of the connecting pipe 200; and when the extension pipe 110 is inserted into the connecting pipe 200, the sealing performance between the extension pipe 110 and the connecting pipe 200 is increased efficiently due to arrangement of the sealing rings 112 and liquid passing through the main body 100 and the connecting pipe 200 is prevented from overflowing from a gap between the extension pipe 110 and the connecting pipe 200.

Embodiment 5

Figure 11:
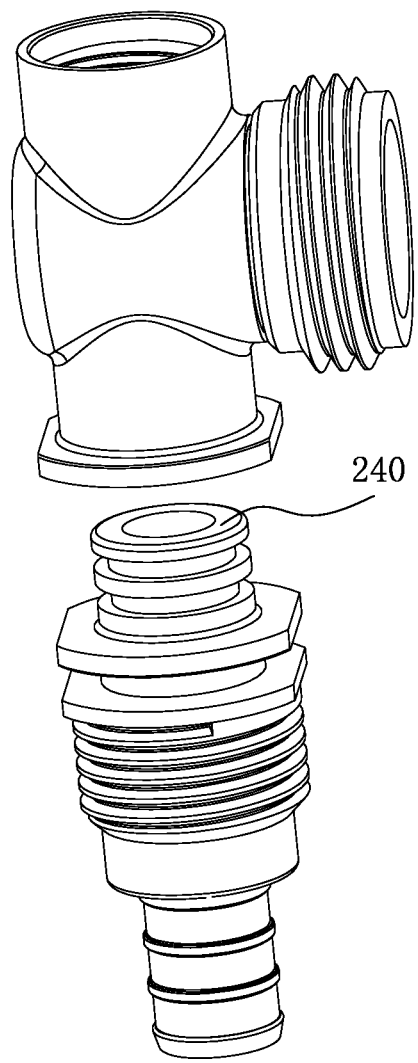
FIG. 11 is an exploded view of the main body and the connecting pipe in the embodiment 5.
Figure 12:
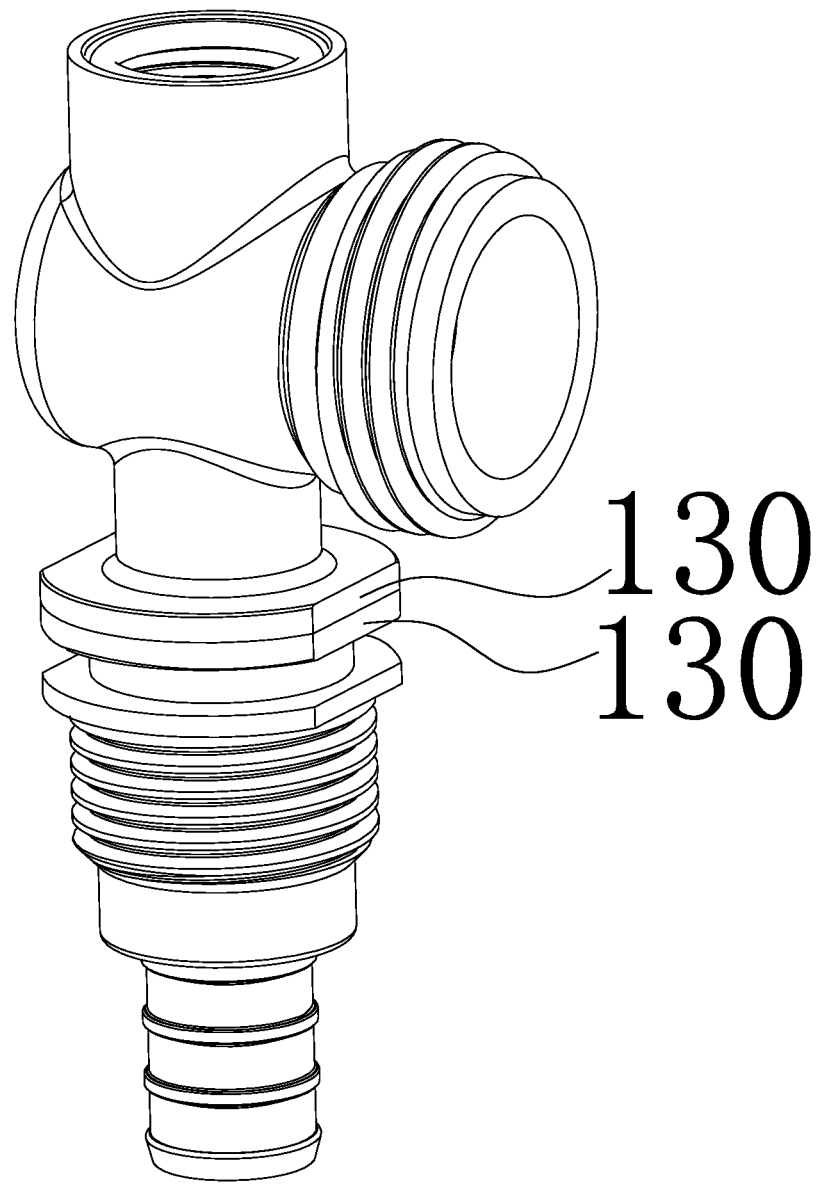
FIG. 12 is a structure diagram of the upper clamping ring and the lower clamping ring are in contact connection when the number of the clamping sides are two.
Figure 13:
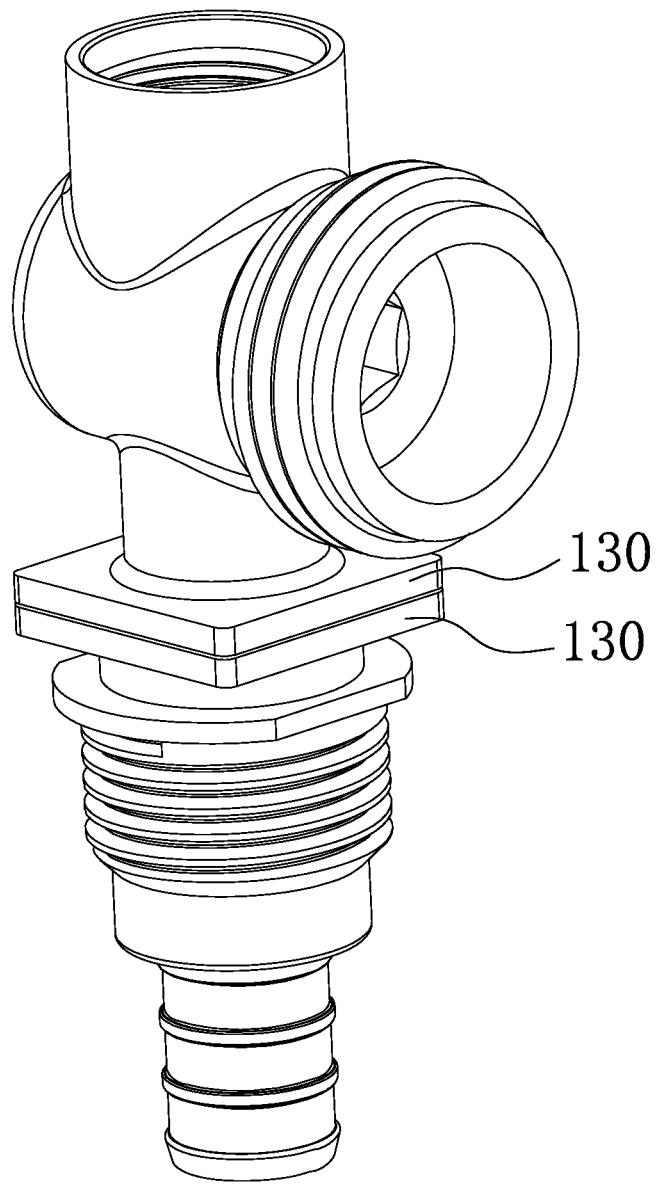
FIG. 13 is a structure diagram of the upper clamping ring and the lower clamping ring are in contact connection when the number of the clamping sides are four.
Figure 14:
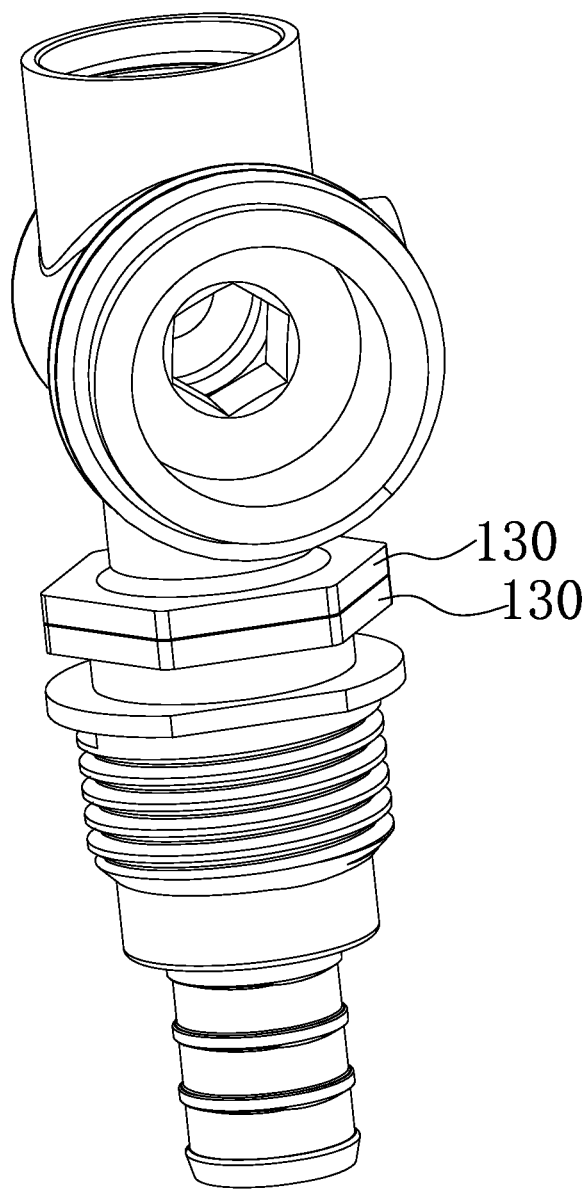
FIG. 14 is a structure diagram of the upper clamping ring and the lower clamping ring are in contact connection when the number of the clamping sides are six.
Figure 15:
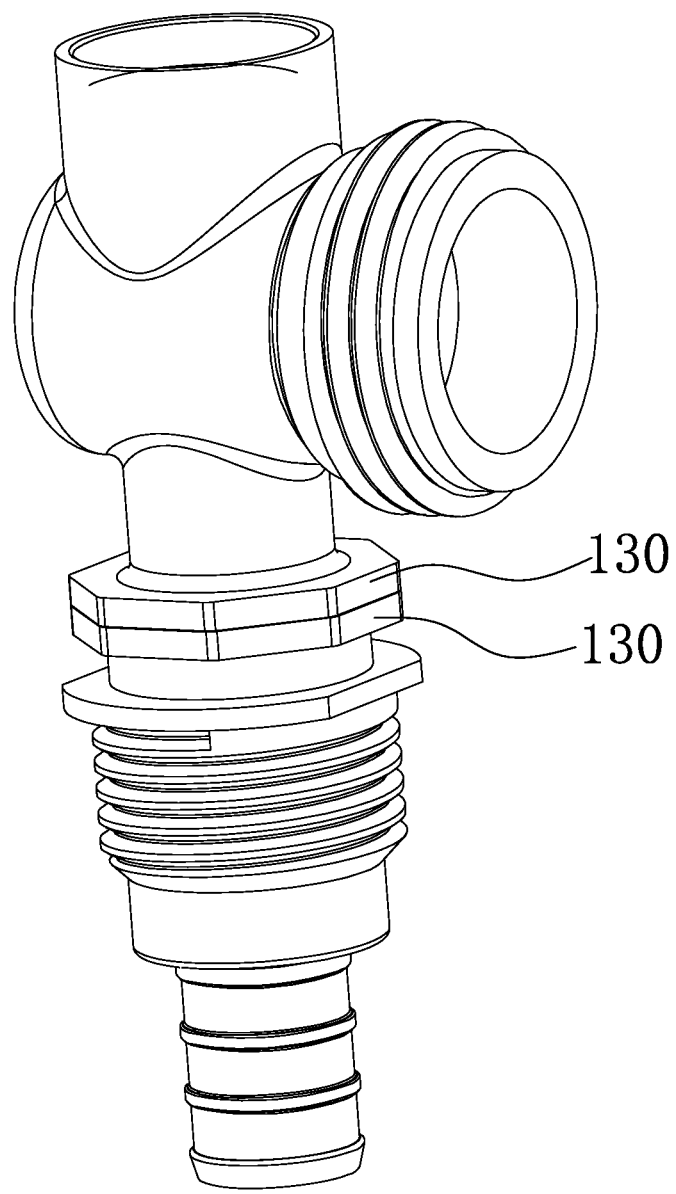
FIG. 15 is a structure diagram of the upper clamping ring and the lower clamping ring are in contact connection when the number of the clamping sides are eight.
Figure 16:
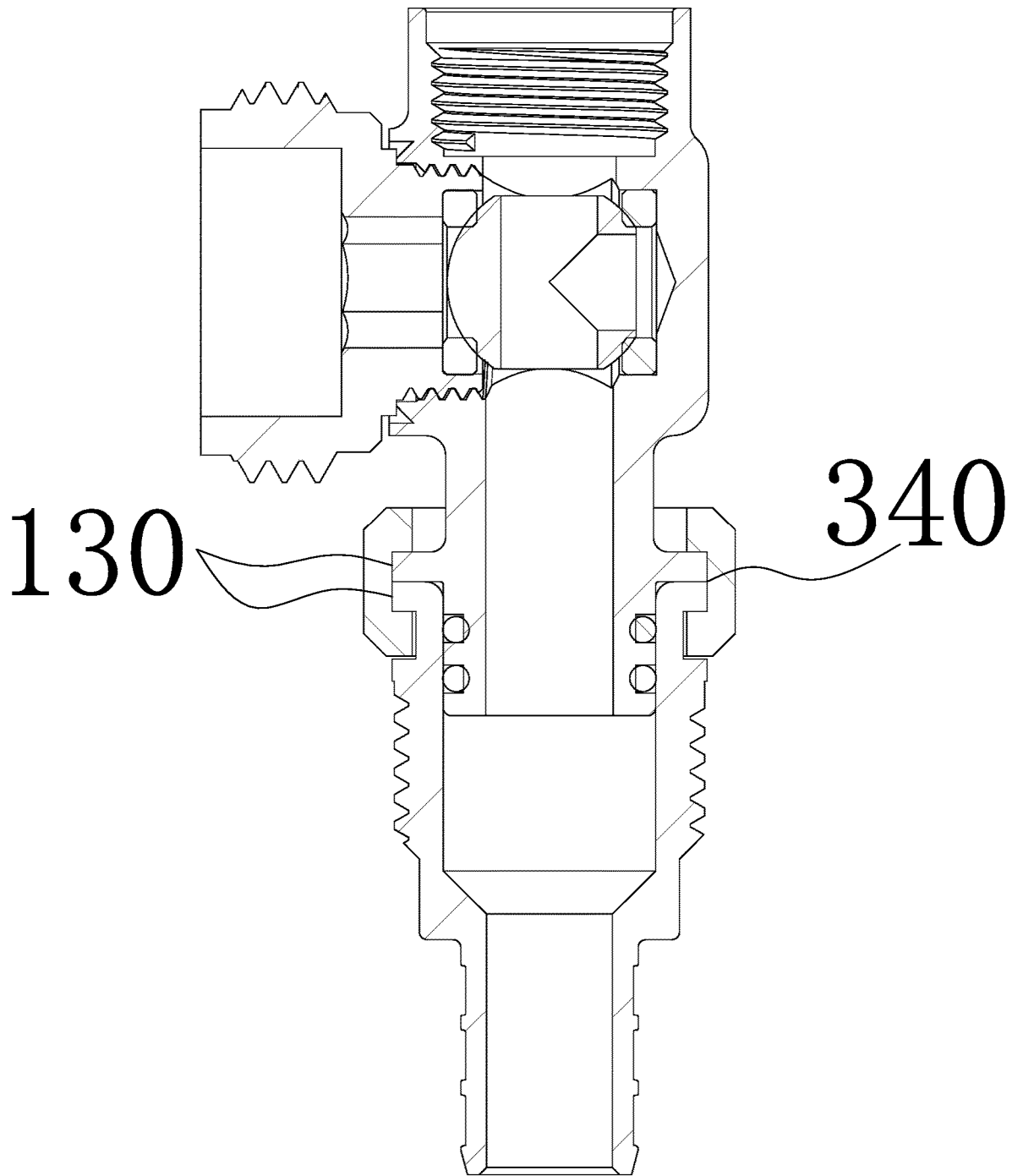
FIG. 16 shows a cross-sectional view of the structure of FIG. 1.

As shown in FIG. 11, the distinction between this embodiment and the embodiment 4 is that the extension pipe in the embodiment 4 is removed and an insertion pipe 240 is additionally arranged at the connecting pipe in this embodiment.

Specifically, the insertion pipe 240 with one end away from the connecting pipe inserted in the main body is arranged on the connecting pipe; and positioning installation of the connecting pipe and the main body is realized by inserting the insertion pipe 240 in the main body during installation.

The specific embodiments described herein are merely illustrative of the spirit of the present invention. Technicians in the technical field of the invention may make various modifications, supplements or substitutions in similar way for the described specific embodiments without deviating from the spirit of the invention or exceeding the scope defined in the attached Claims.

What is claimed:

1. A detachable valve, characterized by comprising:
   a main body; and
   a connecting pipe configured to connect with an external water pipe, the connecting pipe being in detachable connection with the main body through a connecting assembly;
   wherein the connecting assembly limits relative rotation of the main body and the connecting pipe;
   the main body is provided with an upper clamping ring, the connecting pipe is provided with a lower clamping ring corresponding to the upper clamping ring, and the upper clamping ring and the lower clamping ring are connected in a detachable manner through the connecting assembly;
   a plurality of flat clamping planes is formed in a circumferential surface and distributed in a circumferential direction of each of the upper clamping ring and the lower clamping ring, and the number of the clamping planes of each of the upper clamping ring and the lower clamping ring is two, four, six or eight;
   when the upper clamping ring and the lower clamping ring are in contact connection, each of the flat clamping planes of the upper clamping ring corresponds to a corresponding flat clamping plane of the lower clamping ring, such that each of the flat clamping sides of the upper clamping ring and the corresponding flat clamping plane of the lower clamping ring are coplanar plane;
   the connecting assembly comprises a left holding ring and a right holding ring, one end of the left holding ring is hinged to one end of the right holding ring, and the other end of the left holding ring is in detachable connection with the other end of the right holding ring;
   both the left holding ring and the right holding ring are provided with a clamping groove used for clamping the upper clamping ring and the lower clamping ring, each clamping groove is internally provided with a limiting surface used for limiting rotation of the upper clamping ring or the lower clamping ring relative to the clamping groove, and the clamping planes are in contact connection with the corresponding limiting surfaces; and
   a limiting ring is arranged on a side surface of the connecting pipe; a gap exists between the limiting ring and the lower clamping ring in an axial direction of the connecting pipe; a lower end surface of the left holding ring and a lower end surface of the right holding ring are embedded in the gap to limit relative axial movement of the connecting pipe and the connecting assembly when the upper clamping ring and the lower clamping ring are clamped in the clamping grooves.

2. The detachable valve according to claim 1, wherein ratchet surfaces are arranged at the edge of the upper clamping ring and the edge of the lower clamping ring in an encircling manner; and the ratchet surfaces are meshed with the interior of the connecting assembly.

3. The detachable valve according to claim 2, wherein the connecting assembly comprises a left holding ring and a right holding ring; one end of the left holding ring is hinged to one end of the right holding ring; and the other end of the left holding ring is in detachable connection with the other end of the right holding ring.

4. The detachable valve according to claim 3, wherein both the left holding ring and the right holding ring are provided with a clamping groove used for clamping the upper clamping ring and the lower clamping ring; and each the clamping groove is internally provided a meshing tooth surface used for limiting the rotation of the upper clamping ring and/or the lower clamping ring relative to the clamping groove; and the ratchet surfaces are meshed with the meshing tooth surfaces.

5. The detachable valve according to claim 1, wherein the upper clamping ring is provided with at least two connecting lugs; and the lower clamping ring is provided with at least two lower connecting lugs.

6. The detachable valve according to claim 5, wherein the connecting assembly comprises at least two bolts; and the upper connecting lugs of the upper clamping ring are connected to the lower connecting lugs of the lower clamping ring through bolts.

7. The detachable valve according to claim 1, wherein the main body is provided with an extension pipe with one end away from the main body inserted in the connecting pipe.

8. The detachable valve according to claim 7, wherein multiple grooves are formed in an outer surface of said one end and arranged at intervals, and each of the grooves is provided with a sealing ring.

9. The detachable valve according to claim 1, wherein the connecting pipe is provided with an insertion pipe with one end away from the connecting pipe inserted in the main body.

10. The detachable valve according to claim 1, wherein each clamping groove comprises an upper surface facing the upper clamping ring, a lower surface facing the lower clamping ring and a side surface connecting the upper surface and the lower surface, the side surface acting as the limiting surface.

\* \* \* \* \*